(12) United States Patent
Maehara et al.

(10) Patent No.: US 12,356,511 B2
(45) Date of Patent: Jul. 8, 2025

(54) HEATER FOR MELTING GLASS

(71) Applicant: AGC Inc., Tokyo (JP)

(72) Inventors: Terutaka Maehara, Tokyo (JP); Akifumi Niwa, Tokyo (JP); Shuntaro Hyodo, Tokyo (JP); Yukihito Akita, Tokyo (JP); Takashi Enomoto, Tokyo (JP); Yoji Doi, Tokyo (JP); Roger Pauli, Stourbridge (GB); Lawrence Keen, Stourbridge (GB)

(73) Assignee: AGC INC., Tokyo (JP)

( * ) Notice: Subject to any disclaimer, the term of this patent is extended or adjusted under 35 U.S.C. 154(b) by 473 days.

(21) Appl. No.: 17/840,263

(22) Filed: Jun. 14, 2022

(65) Prior Publication Data

US 2022/0312554 A1    Sep. 29, 2022

Related U.S. Application Data (63) Continuation of application No. PCT/JP2020/046033, filed on Dec. 10, 2020.

(30) Foreign Application Priority Data

Dec. 20, 2019  (JP) ................. 2019-230938

(51) Int. Cl.
*C03B 5/033* (2006.01)
*F27D 11/02* (2006.01)
(Continued)

(52) U.S. Cl.
CPC ............. *H05B 3/145* (2013.01); *C03B 5/033* (2013.01); *F27D 11/02* (2013.01); *H05B 3/40* (2013.01); *H05B 2203/025* (2013.01)

(58) Field of Classification Search
None
See application file for complete search history.

(56) References Cited

U.S. PATENT DOCUMENTS 4,556,202 A * 12/1985 Yamura ................. H05B 3/64
                                                         266/280
5,271,032 A    12/1993 Phillips
(Continued)

FOREIGN PATENT DOCUMENTS

JP           561992 U  *  8/1993
JP       2002286892 A  * 10/2002 ............. C03B 5/033
(Continued)

OTHER PUBLICATIONS

JP-2017079149-A Machine Translation by Clarivate Analytics retrieved Oct. 31, 2024. (Year: 2024).*
(Continued)

*Primary Examiner* — Lisa L Herring
(74) *Attorney, Agent, or Firm* — Foley & Lardner LLP

(57) ABSTRACT

A heater for melting glass includes: a heating member containing carbon (C) configured to emit heat rays upon power feeding; and a tubular member made of metal configured to have one end closed, and to house the heating member. The heating member includes a first heat generating part and a second heat generating part along an extending axis direction of the heater, and the first heat generating part is arranged at a position closer to the one end of the tubular member than is the second heat generating part. Denoting a unit-length resistance of the first heat generating part along the extending axis direction by X ($\Omega/m$), and denoting a unit-length resistance of the second heat generating part by Y ($\Omega/m$), $$(1/30)X < Y < (1/2)X \quad \text{Formula (1)}$$

is satisfied.

10 Claims, 5 Drawing Sheets

(51) Int. Cl.
 H05B 3/14 (2006.01)
 H05B 3/40 (2006.01)

(56) References Cited

U.S. PATENT DOCUMENTS

| | | | | |
|---|---|---|---|---|
| 6,146,443 | A | * | 11/2000 | Eckert .................... C22B 9/103 |
| | | | | 428/408 |
| 2012/0275483 | A1 | * | 11/2012 | De Angelis ........... C03B 5/1672 |
| | | | | 373/41 |
| 2021/0078892 | A1 | | 3/2021 | Maehara et al. |

FOREIGN PATENT DOCUMENTS

| | | | |
|---|---|---|---|
| JP | 2017079149 A | * | 4/2017 |
| JP | 2018-193268 A | | 12/2018 |
| WO | WO-2019235474 A1 | * | 12/2019 |

OTHER PUBLICATIONS

JP-2002286892-A Machine Translation by Clarivate Analytics retrieved Oct. 31, 2024. (Year: 2024).*
JPH0561992U Machine Translation retrieved Oct. 31, 2024. (Year: 2024).*
International Searching Authority, "International Search Report," issued in connection with International Patent Application No. PCT/JP2020/046033, dated Jan. 19, 2021.
International Searching Authority, "Written Opinion," issued in connection with International Patent Application No. PCT/JP2020/046033, dated Jan. 19, 2021.

* cited by examiner

HEATER FOR MELTING GLASS

CROSS-REFERENCE TO RELATED APPLICATIONS

This U.S. non-provisional application is a continuation application of and claims the benefit of priority under 35 U.S.C. § 365(c) from PCT International Application PCT/JP2020/046033 filed on Dec. 10, 2020, which is designated the U.S., and is based upon and claims the benefit of priority of Japanese Patent Application No. 2019-230938 filed on Dec. 20, 2019, the entire contents of which are incorporated herein by reference.

TECHNICAL FIELD

The present disclosure relates to heater for melting glass.

BACKGROUND ART

During the course of manufacturing glass, a pair of electrodes is often used when manufacturing molten glass in a melting furnace.

Each of the electrodes is mounted "vertically" to penetrate through a bottom portion of the melting furnace from the bottom portion side. Molten glass can be obtained by energizing with an electric current the pair of electrodes in such an arrangement (see, for example, Japanese Laid-Open Patent Application No. 2018-193268).

In a conventional method of melting glass, when directly heating molten glass, the molten glass is Joule-heated by flowing an alternate current between the electrodes inserted into the molten glass. Therefore, through holes for inserting the electrodes are formed at the bottom portion of the melting furnace.

The dimension of the cross-section perpendicular to the extending direction of these through holes is normally selected to be sufficiently greater compared to the dimension of the cross-section perpendicular to the axial direction of the electrodes.

This is to prevent breakage of the electrodes or the melting furnace during the course of manufacturing molten glass caused by the electrodes coming into contact with the side walls forming the through holes, due to a difference in magnitude of the thermal expansion between the materials of the melting furnace and the electrodes.

However, due to such dimensioning, while manufacturing molten glass, the molten glass may leak from a "gap" between a side wall and an electrode. In order to avoid such leakage, a cooling member is typically provided around the electrode.

Part of the cooling member is positioned to face the lower surface of the bottom portion of the melting furnace when the electrode is inserted into the melting furnace.

By supplying a refrigerant such as air or water to the cooling member installed in this way, the molten glass that is falling through the gap can be solidified halfway through while manufacturing molten glass. Also, the solidified glass layer can be used as a sealing material to close the gap.

However, such a cooling member is not desirable from the viewpoint of the heating efficiency of glass. In other words, the presence of such a cooling member acts on the molten glass at the bottom of the melting furnace, to move the temperature in a reducing direction. Therefore, the heating efficiency of the glass decreases.

Also, as the electrodes themselves are not the heating elements, in such circumstances, in order to give a desired temperature history to the entirety of the molten glass, an additional facility is required so as to generate convective circulation in the molten glass.

For example, it is necessary to make the melting furnace larger, or to install a stirring device. However, such measures lead to the cost increase of the manufacturing facilities.

SUMMARY

According to an embodiment in the present disclosure, a heater for melting glass is provided that includes:
a heating member containing carbon (C) configured to emit heat rays upon power feeding; and
a tubular member made of metal configured to have one end closed, and to house the heating member,
wherein the heating member includes a first heat generating part and a second heat generating part along an extending axis direction of the heater, and the first heat generating part is arranged at a position closer to the one end of the tubular member than is the second heat generating part, and
wherein denoting a unit-length resistance of the first heat generating part along the extending axis direction by X ($\Omega$/m), and denoting a unit-length resistance of the second heat generating part by Y ($\Omega$/m), $$(1/30)X < Y < (1/2)X \quad \text{Formula (1)}$$

is satisfied.

EMBODIMENTS OF THE INVENTION

In the following, with reference to the drawings, embodiments of the present invention will be described.

According to one embodiment in the present disclosure, a heater for melting glass that can significantly increase the heating efficiency of molten glass compared to a conventional method can be provided.

First, with reference to FIG. 1, a conventional method of melting glass and its problems will be described.

Figure 1:
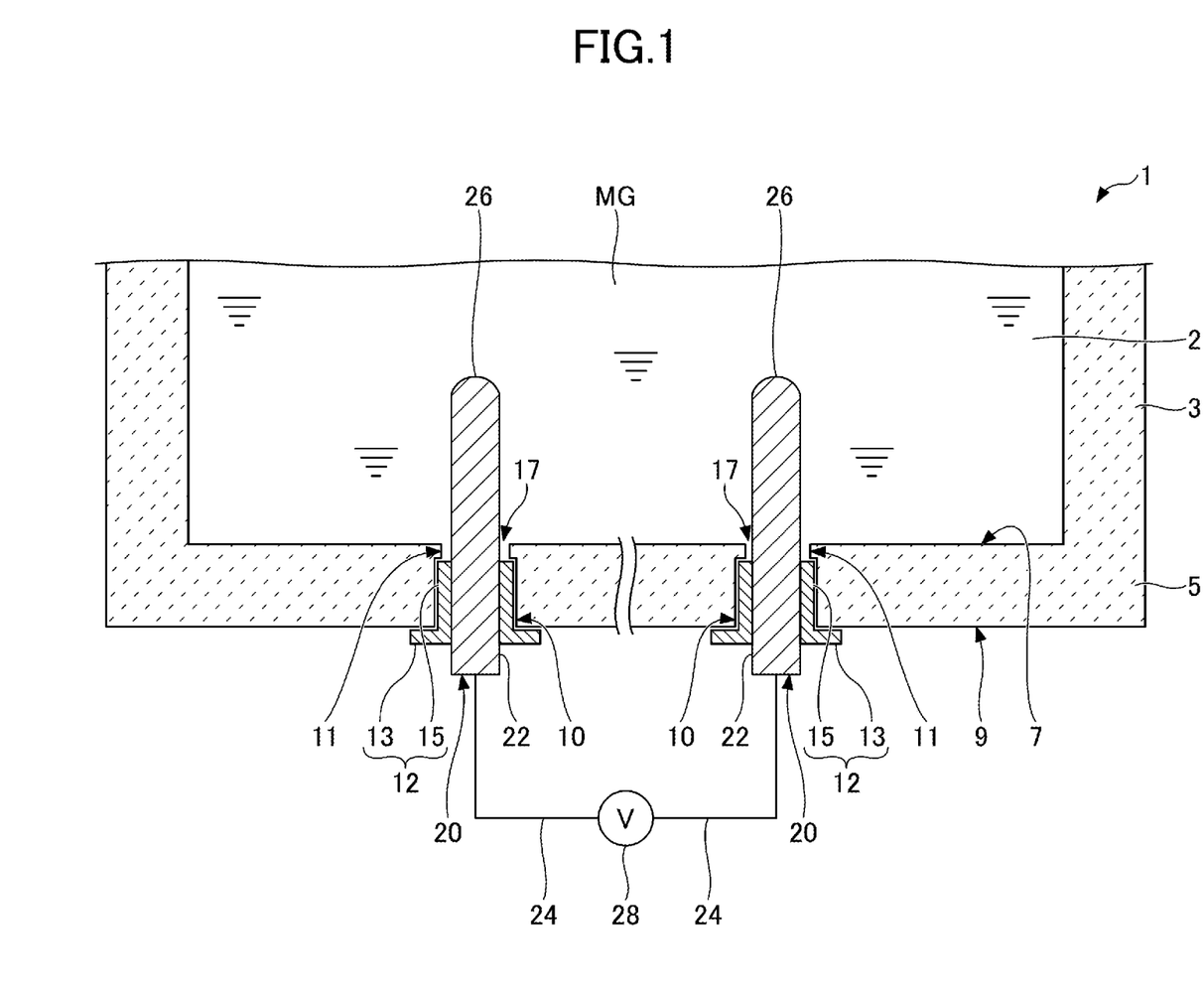
FIG. 1 is a diagram generally illustrating a state when conventional electrodes are installed in a melting furnace.

FIG. 1 schematically illustrates a state when a conventional pair of electrodes 20 are installed in a melting furnace 1 of glass.

As illustrated in FIG. 1, the melting furnace 1 of glass has a structure capable of containing molten glass MG in a housing space 2. Specifically, the melting furnace 1 has a side portion 3 and a bottom portion 5 surrounded by the side portion 3. The bottom portion 5 has an upper surface 7 and a lower surface 9. The upper surface 7 is a surface of the bottom portion 5 in contact with the molten glass MG, and the lower surface 9 is a surface of the bottom portion 5 opposite to the upper surface 7.

The melting furnace 1 has through holes 10 that penetrate through the bottom portion 5 from the upper surface 7 to the lower surface 9.

The electrode 20 is formed of a main body 22 and a lead member 24. The main body 22 is made of, for example, rod-shaped platinum or molybdenum.

The lead member 24 is positioned in the vicinity of one end of the main body 22. Also, another end 26 of the main body 22 (referred to as "tip end") is inserted into the housing space 2 via the through hole 10 at the bottom portion 5 of the melting furnace 1.

Note that normally, the dimension of the cross-section perpendicular to the extending direction of the through hole 10 is selected to be sufficiently greater compared to the dimension of the cross-section perpendicular to the axial direction of the main body 22 of the electrode 20.

Also, in the example illustrated in FIG. 1, only one pair of the electrodes 20 is illustrated. However, in practice, more pairs of the electrodes 20 are placed in the housing space 2 of the melting furnace 1.

As illustrated in FIG. 1, normally, the electrode 20 is provided with a cooling member 12.

The cooling member 12 has a first portion 13 and a second portion 15. The first portion 13 of the cooling member 12 is provided at a position facing the bottom surface 9 of the bottom portion 5 of the melting furnace 1, when the electrode 20 is inserted into the melting furnace 1. Also, the second portion 15 of the cooling member 12 is provided at a position facing a sidewall 11 forming the through hole 10 in the bottom portion 5 of the melting furnace 1. A refrigerant such as air or water circulates in the cooling member 12.

In such a configuration, the lead member 24 of the electrode 20 is connected to a power feeding device 28 such as an external voltage source. Therefore, an electric current can flow through the molten glass to energize and heat the molten glass between both electrodes 20. As a result, the molten glass can be heated up to a desired temperature. Also, the housing space 2 of the melting furnace 1 is filled with the molten glass MG, and by flowing an alternate current between the electrodes inserted into the molten glass, the molten glass MG is Joule-heated.

Note that there are "gaps" 17 between the through holes 10 formed in the bottom portion 5 of the melting furnace 1 and the electrodes 20. Therefore, the molten glass MG may leak from the gaps 17 while heating the molten glass MG.

The cooling member 12 is used for managing such leakage. In other words, by supplying a refrigerant to the first portion 13 and the second portion 15 of the cooling member 12, the molten glass MG moving along the gap 17 can be cooled to be solidified halfway through on the sidewall 11. Also, the solidified glass layer can be used as a sealing material of the gap 17.

However, the second portion 15 of the cooling member 12 is placed at a position relatively close to the upper surface 7 of the bottom portion 5 of the melting furnace 1, namely, the molten glass MG. Therefore, the second portion 15 of the cooling member 12 acts on the molten glass MG, to move the temperature in a reducing direction. In particular, on the upper side of the second portion 15 of the cooling member 12, it becomes difficult to rapidly increase the temperature of the molten glass MG. As a result, a problem that the heating efficiency of the molten glass is reduced may arise.

Note that the first portion 13 of the cooling member 12 is installed at a position relatively far from the molten glass MG, and hence, has a smaller effect in lowering the temperature of the molten glass MG than the second portion 15.

In contrast, the one embodiment of the present invention provides a heater that includes:
 a heating member containing carbon (C) configured to emit heat rays upon power feeding; and
 a tubular member made of metal configured to have one end closed, and to house the heating member,
 wherein the heating member includes a first heat generating part and a second heat generating part along an extending axis direction of the heater, and the first heat generating part is arranged at a position closer to the one end of the tubular member than is the second heat generating part, and
 wherein denoting a unit-length resistance of the first heat generating part along the extending axis direction by X ($\Omega$/m), and denoting a unit-length resistance of the second heat generating part by Y ($\Omega$/m), $$(1/30)X < Y < (1/2)X \qquad \text{Formula (1)}$$

is satisfied.

In the one embodiment of the present invention, the heater is used for heating molten glass MG instead of the electrodes 20. Also, the heater according to the one embodiment of the present invention has a configuration in which a heating member is housed in a tubular member made of metal.

In such a configuration, heat rays emitted from the heating element can be used for heating the tubular member by radiation, and the heated tubular member can be used for heating the molten glass MG.

Also, the heater according to the one embodiment of the present invention uses a heating member containing carbon (C).

Here, in the case of using metal commonly used in the heating member of a heater (e.g., materials and the like including one or more elements selected from among molybdenum, tungsten, tantalum, niobium, iridium, platinum, and rhodium) as the heating member of the heater according to the one embodiment of the present invention, the heating member may deform by its own weight during use of the heater. This is because the temperature of the molten glass MG often becomes 1600° C. or higher, and thereby, the heating member is heated up to 1800° C. or higher.

However, the heater according to the one embodiment of the present invention uses a heating member containing carbon (C) that does not appreciably deform even at a high temperature of 1800° C. or higher. Therefore, the one embodiment of the present invention can significantly suppress the deformation of the heating member in use.

Further, the heater according to the one embodiment of the present invention has a first heat generating part and a second heat generating part in the heating member.

In this case, the first heat generating part of the heater that is to have a higher temperature can be installed in the housing space of the molten glass MG in the melting furnace 1, and the second heat generating part that does not reach a high temperature as the first heat generating part, can be installed to face the through hole 10 (or its sidewall 11) provided in the bottom portion 5 of the melting furnace 1.

Note that the boundary between the first heat generating part and the second heat generating part may be somewhat shifted toward the housing space 2 side or the through hole 10 side on the upper surface 7 of the bottom portion 5 of the melting furnace 1 as long as it does not affect melting of the glass.

In the case where the heater according to the one embodiment of the present invention is positioned in this way with respect to the melting furnace 1, the temperature of the through hole 10 (or its sidewall 11) in the bottom portion 5 of the melting furnace 1 can be kept at a moderate temperature range without rising too high. Therefore, even in the case where the second portion 15 of the cooling member 12 is not used at all; even if the cooling capability of the second portion 15 of the cooling member 12 is reduced; or even if the length of the second portion 15 of the cooling member 12 is shortened and the distance from the housing 2 of the melting furnace 1 is increased, in the gap 17, the molten glass MG can move along the gap 17 for a significant length, to protect the heater surface by being solidified.

As a result, according to the one embodiment of the present invention, a problem that the molten glass MG tends to become colder easily and to become hard to heat over the upper part of the second portion 15 of the cooling member 12, can be alleviated. In other words, during the course of manufacturing the molten glass MG, the heating efficiency can be increased significantly.

Also, in the conventional electrodes 20, in the case where the main body 22 is formed of molybdenum, a problem of high-temperature oxidation may arise. In other words, if the main body 22 is exposed at a portion facing the through hole 11, the main body 22 is oxidized by high-temperature air, and the electrode may be degraded.

In contrast, in the one embodiment of the present invention, thanks to the effects described above, the molten glass MG can move along the gap 17 to coat the surface of the heater with solidified glass. Therefore, in the one embodiment of the present invention, for the tubular member, materials that are easily oxidized in high-temperature air, like molybdenum, can also be used.

(Heater for Melting Glass According to One Embodiment of Present Invention)

Next, with reference to FIG. 2, one example configuration of the heater according to the one embodiment of the present invention will be described.

Figure 2:
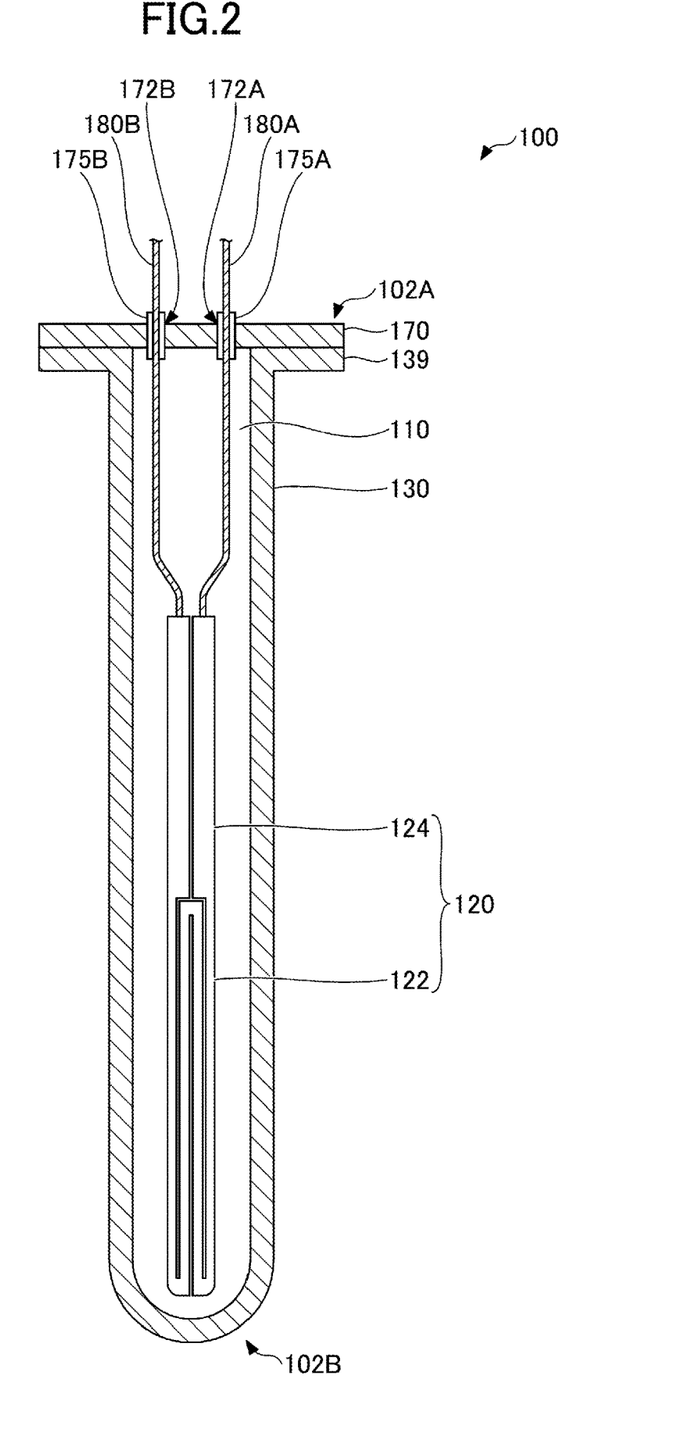
FIG. 2 is a diagram schematically illustrating one example configuration of a heater according to one embodiment of the present invention.

FIG. 2 schematically illustrates an example of the structure of the heater according to the one embodiment of the present invention. FIG. 2 generally illustrates a cross section along the extending axis of the heater according to the one embodiment of the present invention. However, a part corresponding to the heating member 120 that will be discussed later is drawn in a form of other than a cross section for the sake of clarity.

As illustrated in FIG. 2, the heater 100 according to the one embodiment of the present invention (referred to as "the first heater", hereafter) has generally a rod shape extending from a first heater end 102A to a second heater end 102B.

The first heater end 102A is closed by a lid member 170. Also, the second heater end 102B is closed by a closed end of the tubular member 130 that will be discussed later. Therefore, inside the first heater 100, an internal space 110 that is insulated from the outside is formed.

The internal space 110 can be controlled to have a desired atmosphere by a gas supplying means, a gas exhaust means, and/or the like (not illustrated) installed in the first heater 100. In particular, in order to prevent oxidation of various members housed in the internal space 110 while using the first heater 100, it is favorable that the internal space 110 has an atmosphere of non-oxidizing gas. For example, during the use, the internal space 110 may be filled with an inert gas such as argon.

With reference to FIG. 2 again, the first heater 100 includes the heating member 120 and the tubular member 130.

The heating member 120 is housed in the internal space 110. Meanwhile, the tubular member 130 is a member that demarcates the internal space 110 of the first heater 100 together with the lid member 170 described above, and the tubular member 130 protects the members housed in the internal space 110. The tubular member 130 is closed at one end, and this closed end corresponds to the second heater end 102B in the first heater 100.

The tubular member 130 is formed of a metal having heat resistance.

The heating member 120 functions as a heating element that generates heat upon being energized. The heating member 120 is formed of electrically conducting materials, and contains carbon (C).

The heating member 120 includes a first heat generating part 122 and a second heat generating part 124 that are electrically connected to each other. The first heat generating part 122 is arranged at a position closer to the second heater end 102B than is the second heat generating part 124.

Although it may be difficult to see from FIG. 2, the first heat generating part 122 of the heating member 120 is electrically connected to a first lead wire 180A at one end, namely, at the end opposite to another end connected to the second heat generating part. Also, the second heat generating part 124 is electrically connected to a second lead wire 180B at its one end, namely, at the end opposite to another end connected to the first heat generating part.

The first lead wire 180A is derived from a first opening 172A provided in the lid member 170 to the outside of the internal space 110. Similarly, the second lead wire 180B is derived from a second opening 172B provided in the lid member 170 to the outside of the internal space 110. In order to prevent the first lead wire 180A from coming into contact with the lid member 170, a first insulating member 175A is attached to the first opening 172A in the lid member 170. Similarly, in order to prevent the second lead wire 180B from coming into contact with the lid member 170, a second insulating member 175B is attached to the second opening 172B in the lid member 170.

Here, in the first heater 100, in the first heat generating part 122, denoting the unit-length resistance along the extending axis direction of the first heater 100 by X ($\Omega$/m), and in the second heat generating part 124, denoting the unit-length resistance along the extending axis direction of the first heater 100 by Y ($\Omega$/m), $$(1/30)X < Y < (1/2)X \quad \text{Formula (1)}$$

is satisfied.

In the following, the unit-length resistances X and Y are simply referred to as the "resistance X" and the "resistance Y", respectively.

Therefore, while using the first heater 100, the first heat generating part 122 can reach a higher temperature than the second heat generating part 124.

Note that in the present application, the resistance X of the first heat generating part 122 does not need to be constant over the span, and may be increased or decreased within a range of less than ±25%. The same applies to the resistance Y of the second heat generating part 124.

Also, a portion may be present between the first heat generating part 122 and the second heat generating part 124 that exhibits a resistance between the two, namely, less than the resistance X and greater than the resistance Y (referred to as "the transition region", hereafter). Such a change in resistance may occur in a form such that the cross-sectional area gradually becomes larger, for example, in the transition region, from a portion contacting the first heat generating part 122 to a portion contacting the second heat generating part 124. In such a form, the "boundary" between the first heat generating part 122 and the second heat generating part 124 is defined as a portion of the transition region that exhibits an intermediate resistance value between X and Y.

Also, the unit-length resistance of the transition region between the first heat generating part 122 and the second heat generating part 124 may be less than Y. Such a change in resistance may occur, for example, in the case where the first heat generating part 122 and the second heat generating part 124 that have been manufactured separately are joined via a thick bonding member having high rigidity.

In such a form, the "boundary" between the first heat generating part 122 and the second heat generating part 124 is defined as an intermediate position in the axial direction of the bonding member.

<Calculation Method of Resistances X and Y>

Here, a calculation method of the resistances X and Y will be described.

The unit-length resistance X of the first heat generating part 122 and the unit-length resistance Y of the second heat generating part 124 can be determined by software for general-purpose thermal fluid analysis such as STAR-CCM+ (produced by SIEMENS). Taking the unit-length resistance X of the first heat generating part 122 as an example, the calculation method will be described in detail.

1. The shape data of the heating member 120 is incorporated into STAR-CCM+ in the STL format.
2. Physical property values such as the electric conductivity of the material used for the heating member 120 are input. At this time, as the electric conductivity, a value at room temperature is used, and the temperature dependence is not included.
3. Calculation is executed under a condition of flowing an electric current I at one's discretion through both terminals of the heating member connected to the lead wires, to determine an output distribution N (W/m2) of the heating member 120.
4. Two surfaces are set to be perpendicular to the axial direction of the heating member 120 and have a distance L to each other. An output P (W) of the region is obtained by integrating the output distribution N of the region sandwiched between the two surfaces. In this case, the output P of the first heat generating part 122 is obtained by using one of the surfaces set as a surface that crosses the upper end of the heating member 120, and the other surface set as a surface that crosses the boundary between the first heat generating part 122 and the second heat generating part 124.
5. The output P is divided by the electric current $I^2$, to obtain a resistance R in the region.
6. The resistance R is divided by the distance L, to obtain the unit-length resistance X.

The unit-length resistance Y of the second heat generating part 124 can also be determined in substantially the same way by sectioning a region with one surface crossing the lower end of the heating member 120, and the other surface crossing the boundary between the first heat generating part 122 and the second heat generating part 124.

Next, with reference to FIG. 3, operations of the first heater 100 having such a configuration will be described.

Figure 3:
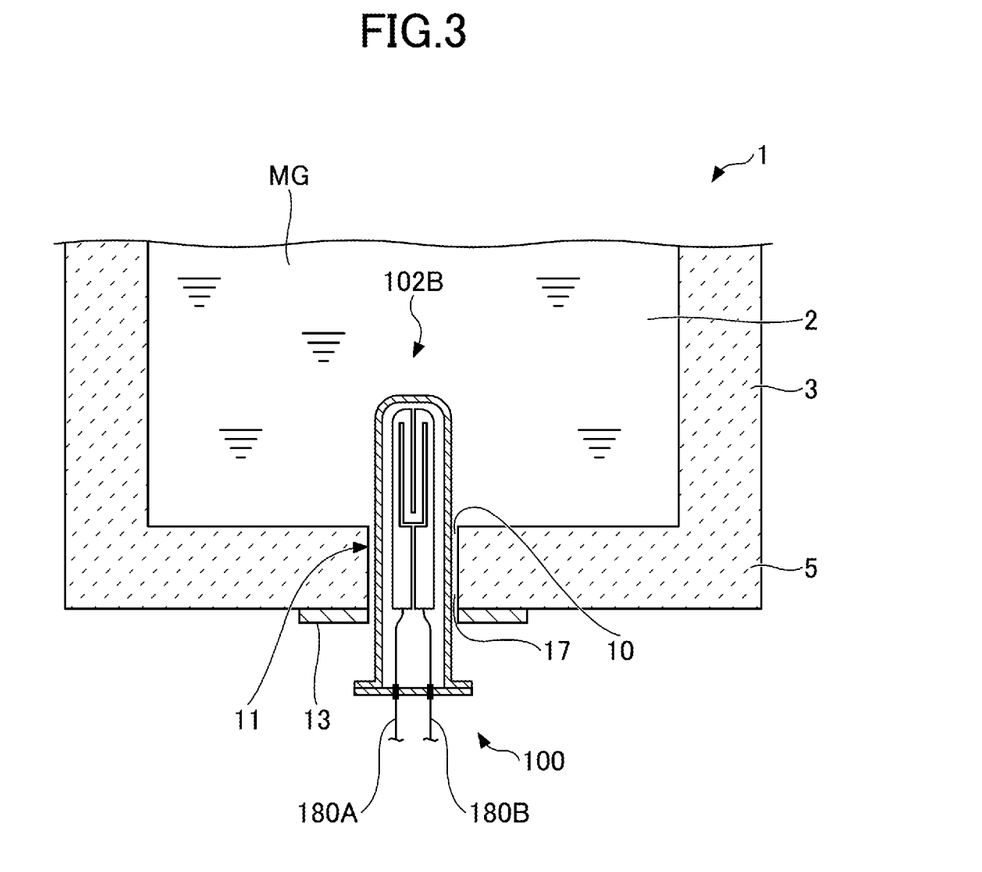
FIG. 3 is a diagram generally illustrating a state when the heater according to the one embodiment of the present invention is installed in a melting furnace.

FIG. 3 schematically illustrates a state when the first heater 100 is installed in the melting furnace 1 of glass. Note that the configuration of the melting furnace 1 has already been described with reference to FIG. 1 above. Therefore, here, except for matters related to the one embodiment of the present invention, the detailed description of the configuration of the melting furnace 1 is omitted.

Note that in the example illustrated in FIG. 3, attention should be paid to the first portion 13 of the cooling member 12 in FIG. 1 as being attached to the bottom portion 5 of the melting furnace 1, not to the first heater 100. Also, in the example illustrated in FIG. 3, the second portion 15 of the cooling member 12 in FIG. 1 is removed.

As illustrated in FIG. 3, when using the first heater 100, at the outset, the first heater 100 is installed in the melting furnace 1. The first heater 100 is installed "vertically" so that the second heater end 102B side is inserted into the housing space 2 via the through hole 10 at the bottom portion 5 of the melting furnace 1.

Next, raw materials of glass are supplied into the housing space 2 of the melting furnace 1.

Thereafter, by using a power feeding device (not illustrated in FIG. 3), an electric current is supplied to the first lead wire 180A and the second lead wire 180B of the first heater 100. This makes the heating member 120 resistance-heated, and the resulting radiation heats up the tubular member 130. Also, the heat from the tubular member 130 heats up the molten glass MG.

Here, the gap 17 is present between the through hole 10 formed in the bottom portion 5 of the melting furnace 1 and the first heater 100. Therefore, in a conventional method of melting glass, the cooling member 12 has been used to prevent leakage of molten glass MG (see FIG. 1).

However, in the case of using the first heater 100, the temperature drop of the molten glass at the bottom portion of the furnaces of due to the conventional cooling member 12 can be suppressed.

In the following, this effect will be described.

As described above, in the first heater 100, the heating member 120 has the first heat generating part 122 and the second heat generating part 124 along the extending axis direction of the first heater 100. Also, in the internal space 110 of the first heater 100, the first heat generating part 122 is installed at a position closer to the second heater end 102B than is the second heat generating part 124.

Therefore, when the first heater 100 is arranged in the melting furnace 1, the first heater 100 can be arranged, with respect to the melting furnace 1, such that the height position of the first heat generating part 122 corresponds to the housing space 2 of the melting furnace 1, and the height position of the second heat generating part 124 corresponds to the through hole 10 of the melting furnace 1. In other words, the first heater 100 can be installed, with respect to the melting furnace 1, such that the first heat generating part 122 is inside the housing space 2, and the second heat generating part 124 faces the through hole 10.

Also, between the first heat generating part 122 and the second heat generating part 124, the relationship of Formula (1) described above is satisfied. Therefore, the first heat generating part 122 can provide a greater amount of heat to the tubular member 130 than the second heat generating part 124.

Therefore, at a position corresponding to the first heat generating part 122, the tubular member 130 can provide a greater amount of thermal energy to the outside, whereas at a position corresponding to the second heat generating part 124, the tubular member 130 can suppress the amount of heat provided to the outside. As a result, the temperature of the gap 17 can be significantly reduced compared to the temperature of the housing space 2.

Also, in this case, the molten glass MG that moves from the housing space 2 through the gap 17 is solidified halfway through, and thereby, the gaps 17 can be sealed by a glass layer.

In this way, in the case of using the first heater 100, the temperature drop of the molten glass due to the conventional cooling member 12 can be suppressed.

Therefore, in the case of using the first heater 100, the heating efficiency when manufacturing molten glass can be increased significantly.

Also, in the case of simply using a heater instead of a conventional electrode, the temperature of the bottom portion 5 of the melting furnace 1 may become too high, and thereby, erosion of the material of the bottom portion 5 may be accelerated. However, in the first heater 100, the temperature of the second heat generating part 124 does not become as high as that of the first heat generating part 122. Therefore, in the first heater 100, erosion of the bottom portion 5 of the melting furnace 1 can be suppressed significantly.

(Constituent Members of First Heater 100)

Next, the constituent members included in the heater according to the one embodiment of the present invention will be described in more detail. Note that here, for the sake of clarity, the constituent members will be described taking the first heater 100 as an example. Therefore, when referring to each of the members, the reference numeral illustrated in FIG. 2 will be used.

(First Heater 100)

The external shape of the first heater 100 is not limited in particular. The first heater 100 may have, for example, a generally cylindrical shape or a generally square column shape. Also, a cross section perpendicular to the extending axis direction of the first heater 100 may be generally circular, generally elliptic, generally triangular, generally quadrangular, or may have any other polygonal shape (including a trapezoid).

Note that in the following description, as an example, it is assumed that the first heater 100 is generally circular in cross section.

(Internal Space 110 and Lid Member 170)

It is favorable that the internal space 110 housing the heating member 120 has a low oxygen partial pressure while using the first heater 100.

For this reason, the internal space 110 may be filled with a non-oxidizing gas such as a reducing gas and/or an inert gas. As the reducing gas, hydrogen may be used, and as the inert gas, one or more elements selected from among argon, helium, neon, krypton, xenon, radon, and nitrogen may be used.

In addition to this or separately from this, the internal space 110 may be adjusted to have approximately the atmospheric pressure in the use state of the first heater 100.

In order to implement such an environment, the lid member 170 may be provided with one, two, or more ports in communication with the internal space 110. Through these ports, the internal space 110 can be filled with gas, and the gas can be exhausted from the internal space 110.

The configuration of the lid member 170 is not limited in particular, as long as the environment of the internal space 110 can be maintained properly. Therefore, here, the description related to the lid member 170 is omitted.

(Heating Member 120)

The heating member 120 has the first heat generating part 122 and the second heat generating part 124. Both the first heat generating part 122 and the second heat generating part 124 can be formed of materials containing carbon (C).

Materials containing carbon (C) include, for example, graphite, carbon fiber reinforced carbon composite (CC composite), and the like.

Such a carbon material has a feature that deformation does not appreciably occur even at a high temperature of 2000° C. or higher. Therefore, by forming the heating member 120 with a carbon-containing material, a problem of deformation of the heating member 120 due to its own weight while using the first heater 100 can be suppressed significantly.

This feature also allows the first heater 100 to be used in a "vertical" orientation as illustrated in FIG. 2.

Here, the first heat generating part 122 and the second heat generating part 124 are configured to satisfy Formula (1) described above.

In other words, in order to satisfy Formula (1) described above, the second heat generating part 124 may have different materials and/or different shapes other than those of the first heat generating part 122.

The shape of the first heat generating part 122 is not limited in particular. The first heat generating part 122 may have, for example, a circular tube shape having periodic slits as illustrated in FIG. 2. Alternatively, the first heat generating part 122 may be coil-shaped, rod-shaped (non-hollow), plate-shaped, tubular (hollow), or the like.

Figure 4:
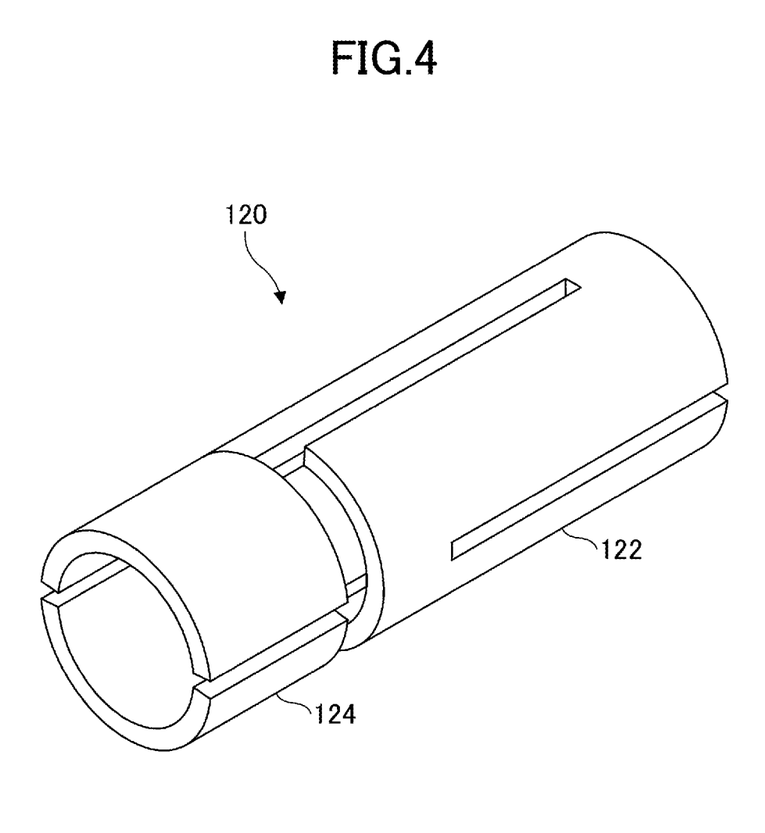
FIG. 4 is a diagram schematically illustrating another form of a first heat generating part in the heater according to the one embodiment of the present invention.

FIG. 4 illustrates an example of a solid figure of the heating member 120.

In FIG. 4, the first heat generating part 122 has a structure in which a hollow, generally cylindrical electric conductor is provided with multiple slits along the extending axis direction of the first heater 100. The slits are provided alternately from a first direction (e.g., from the upper right side in FIG. 4) and a second direction (e.g., from the lower left side in FIG. 4) opposite to the first direction.

Similarly, the shape of the second heat generating part 124 is not limited in particular. The second heat generating part 124 may have, for example, a tubular (hollow) shape as illustrated in FIG. 4 provided with a small number of slits (two slits in FIG. 4) along the extending axis direction of the first heater 100.

Alternatively, the second heat generating part 124 may have a coil shape, rod shape (non-hollow), plate shape, or the like. Also, in the case where the first heat generating part 122 and the second heat generating part 124 have a cylindrical shape with helically periodic slits, the first heat generating part 122 and the second heat generating part 124 may have slits provided with different periods. Alternatively, in the case where the first heat generating part 122 and the second heat generating part 124 have a cylindrical shape with multiple slits along the extending axis direction of the first heater 100, as illustrated in FIG. 4, the first heat generating part 122 and the second heat generating part 124 may have slits provided with different periods. Alternatively, the first heat generating part 122 and the second heat generating part 124 may have different shapes from each other.

Alternatively, both the first heat generating part 122 and the second heat generating part 124 may be formed to have a coil shape. Between the coil-shaped first heat generating part 122 and the coil-shaped second heat generating part 124, the number of turns and/or the thickness of the coil may be varied so as to satisfy Formula (1) described above.

Meanwhile, as for the material, for example, the first heat generating part 122 may be formed of a CC composite having a first carbon content (C1), and the second heat generating part 124 may be formed of a CC composite having a second carbon content (C2). By selecting appropriate C1 and C2 and satisfying C1<C2, the first heat generating part 122 and the second heat generating part 124 that satisfy Formula (1) described above can be formed.

In addition to this or separately from this, for example, the first heat generating part 122 may be formed of a CC composite having a first porosity (P1), and the second heat generating part 124 may be formed of a CC composite having a second porosity (P2). By selecting appropriate P1 and P2 and satisfying P1>P2, the first heat generating part 122 and the second heat generating part 124 that satisfy Formula (1) described above can be formed.

It would be obvious for one skilled in the art who scrutinizes the description of the present description that there may also be various combinations for the first heat generating part 122 and the second heat generating part 124.

In order to compensate for the temperature drop at the bottom portion of the furnace due to the cooling member, as in Formula (1) described above, the resistance X ($\Omega$/m) in the first heat generating part 122 and the resistance Y ($\Omega$/m) in the second heat generating part 124 satisfy ($1/30$)X<Y. It is favorable that the relationship between the two satisfies ($1/20$)X<Y, and more favorable to satisfy ($1/10$)X<Y.

Meanwhile, the resistance X ($\Omega$/m) and the resistance Y ($\Omega$/m) satisfy Y<($1/2$)X, in order to suppress erosion of the bottom portion of the furnace. It is favorable that the relationship between the two satisfies Y<($1/3$)X, and more favorable to satisfy Y<($1/4$)X.

The temperature of the first heat generating part 122 while using the first heater 100 also varies depending on the type of glass to be melted, for example, within a range of 800° C. to 2000° C. The temperature of the first heat generating part 122 may be within a range of 900° C. to 1800° C.

Meanwhile, the temperature of the second heat generating part 124 while using the first heater 100 is lower than the temperature of the first heat generating part 122 by 100° C. or more. The temperature of the second heat generating part 124 is favorably lower than the temperature of the first heat generating part 122 by 200° C. or more, further favorably by 300° C. or more.

(Tubular Member 130)

The tubular member 130 is formed of a cylindrical metal having its one end sealed, as described above. The tubular member 130 may be formed of a material, for example, containing one or more elements selected from among platinum, tungsten, iridium, rhodium, and molybdenum.

Here, some of refractory metals, such as molybdenum and tungsten, are known to have a notably reduced oxidation resistance in a predetermined temperature range. For example, molybdenum in a temperature range around 400° C. or higher, or tungsten in a temperature range around 500° C. or higher has a significantly reduced oxidation resistance. Also, this "dangerous" temperature range corresponds to a temperature range exposed to part of the tubular member of the heater for melting glass that faces the side wall 11 of the bottom portion 5 of the melting furnace 1.

Therefore, in the case of using metals such as molybdenum and tungsten for the tubular member of the heater for melting glass, at the part facing the sidewall 11, there is a likelihood that air oxidation proceeds accordingly.

Figure 5:
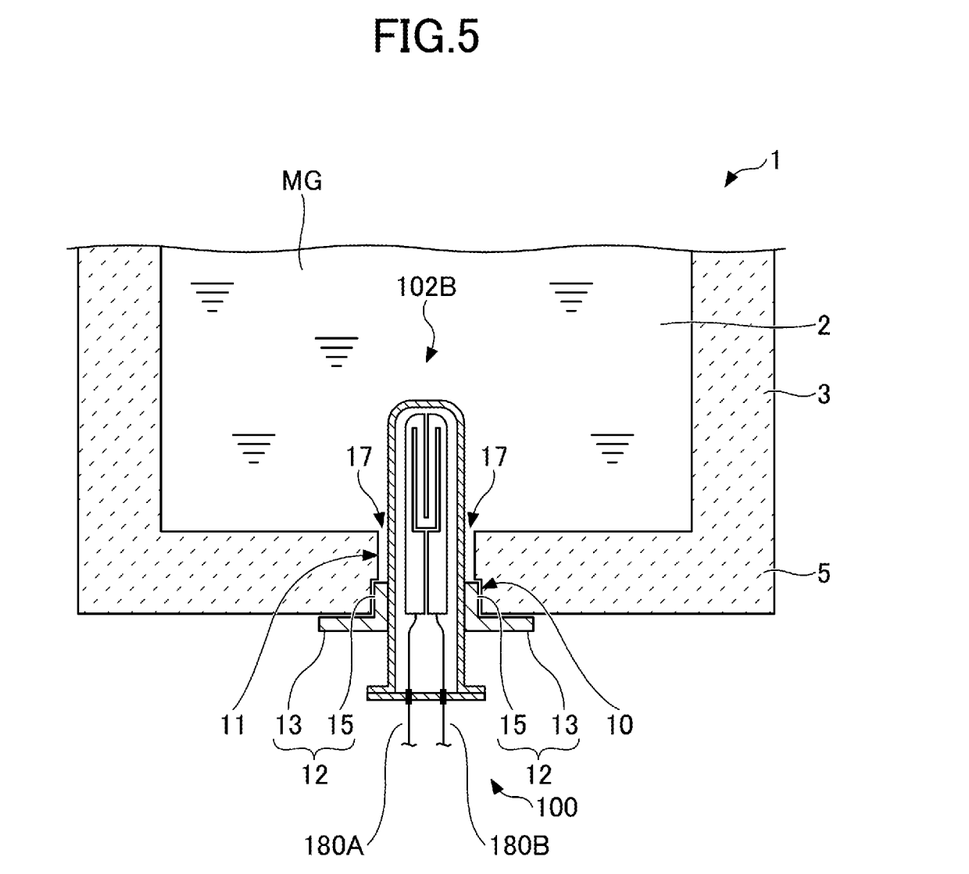
FIG. 5 is a diagram generally illustrating a state when a heater according to another embodiment of the present invention is installed in a melting furnace.

However, in the first heater 100, thanks to the effects described above, the gap 17 between the side wall 11 of the bottom portion 5 of the melting furnace 1 and the first heater 100 are sealed with the molten glass MG and a glass layer formed by the solidified molten glass MG. In other words, the part of the tubular member 130 facing the sidewall 11 is covered with the glass layer, and is suppressed from contacting with the atmosphere. Also, in the first heater 100, by being heated by the second heat generating part 124, the molten glass MG is prevented from solidifying immediately, enters the depth of the gap 17, and thereby, can seal the tubular member 130 by the glass layer down to a location close to the bottom surface 9 of the bottom portion 5 of the melting furnace 1. Therefore, as illustrated in FIG. 5, in the case of providing the second portion 15 of the cooling member 12 around the tubular member 130, the second portion 15 can be provided at a position away from the housing space 2. Accordingly, the oxidation of the tubular member 130 can be prevented sufficiently, and the temperature drop of the molten glass MG in the housing space 2 can be prevented.

Therefore, in the first heater 100, even if a metal containing molybdenum and tungsten is used as the tubular member 130, the oxidation in the part facing the sidewall 11 can be suppressed significantly.

It is favorable that the open end of the tubular member 130 has a shape with which flange connection is established with the lid member 170, for example, a shape of a flange portion 139 as illustrated in FIG. 2. By the flange connection of the flange portion 139 and the lid member 170, the internal space 110 can be properly closed tightly.

Between the flange portion 139 and the lid member 170, an O-ring formed of heat-resistant rubber or a metallic gasket may be installed.

(First Lead Wire 180A and Second Lead Wire 180B)

The first lead wire 180A and the second lead wire 180B are formed of a material having electric conductivity.

Here, denoting the unit-length resistance in the first lead wire 180A along the extending axis direction of the first heater 100 by Z1 ($\Omega$/m), Z1 is merely less than or equal to $1/30$ of the unit-length resistance X of the first heat generating part 122.

Similarly, denoting the unit-length resistance in the second lead wire 180B along the extending axis direction of the first heater 100 by Z2 ($\Omega$/m), Z2 is merely less than or equal to $1/30$ of the unit-length resistance X of the first heat generating part 122.

Therefore, it is obvious from Formula (1) described above that the first lead wire 180A and the second lead wire 180B do not correspond to the "second heat generating part 124".

The reachable temperature of the first lead wire 180A and the second lead wire 180B is 400° C. or lower at the highest even while using the first heater 100.

(First Insulating Member 175A and Second Insulating Member 175B)

The first insulating member 175A is formed of an insulating material. Also, the first insulating member 175A also needs to have a sealing function of properly sealing a gap between the first opening 172A in the lid member 170 and the first lead wire 180A.

Insulating members having such a sealing function are well known to those skilled in the arts.

The same applies to the second insulating member 175B.

Note that the configuration of the first insulating member 175A and the second insulating member 175B illustrated in FIG. 1 is merely an example. It is obvious to one skilled in the art that the configuration is not limited in particular to the example as long as the first lead wire 180A and the second lead wire 180B can be properly extracted to the outside.

As described above, the configuration of the heater according to the one embodiment of the present invention has been described with reference to the first heater 100.

However, it is obvious to one skilled in the art that the heater according to the one embodiment of the present invention may have other configurations. For example, in the heater according to the one embodiment of the present invention, the heating member is not limited to have two heat generating parts, and may have three or more. Various other changes may also be made.

The invention claimed is:

1. A heater for melting glass, comprising:
   a heating member containing carbon (C) configured to emit heat rays upon power feeding; and
   a tubular member made of metal configured to have one end closed, and to house the heating member,
   wherein the heating member includes a first heat generating part and a second heat generating part along an extending axis direction of the heater, and the first heat generating part is arranged at a position closer to the one end of the tubular member than is the second heat generating part, and
   wherein the first heat generating part has a unit-length resistance along the extending axis direction defined by $X$ ($\Omega$/m), the second heat generating part has a unit-length resistance along the extending direction defined by $Y$ ($\Omega$/m), and the unit-length resistances $X$ and $Y$ of the heating member satisfy Formula (1):

$(1/30)X < Y < (1/2)X.$

2. The heater as claimed in claim 1, wherein one of or both of the first heat generating part and the second heat generating part are formed of a carbon fiber reinforced carbon composite.

3. The heater as claimed in claim 1, wherein the first heat generating part has a shape selected from among a group consisting of a rod shape, a coil shape, and a hollow cylindrical shape with or without a slit.

4. The heater as claimed in claim 1, wherein the second heat generating part has a shape different from that of the first heat generating part.

5. The heater as claimed in claim 1, wherein the first heat generating part and the second heat generating part are arranged to physically contact each other.

6. The heater as claimed in claim 1, wherein the tubular member is formed of a material containing one or more elements selected from among platinum, tungsten, iridium, rhodium, and molybdenum.

7. The heater as claimed in claim 1, wherein the tubular member is formed of a material including at least one of platinum or rhodium.

8. The heater as claimed in claim 1, further comprising:
   a cooling member at part of an outer periphery of the tubular member.

9. The heater as claimed in claim 1, wherein the heater is configured to be capable of controlling an atmosphere inside the tubular member.

10. The heater as claimed in claim 1, wherein a gas is present between the heating member and the tubular member.

* * * * *